(12) United States Patent
Jiang et al.

(10) Patent No.: US 11,325,059 B2
(45) Date of Patent: May 10, 2022

(54) NO FILTER NO RUN FLUID FILTER WITH INTEGRATION OF LOW PRESSURE FLUID SYSTEM

(71) Applicant: CUMMINS FILTRATION IP, INC., Columbus, IN (US)

(72) Inventors: Zemin Jiang, Cookville, TN (US); Gregory W. Hoverson, Columbus, IN (US); W. Beale Delano, Jr., Columbus, IN (US); Dennis M. DeCapua, Greenfield, IN (US); Bharadwaj R. Prabhala, Columbus, IN (US); Rahul R. Pandey, Pune (IN); Mayur Hogade, Pune (IN); Bhargava S. Atmuri, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 96 days.

(21) Appl. No.: 16/547,892

(22) Filed: Aug. 22, 2019

(65) Prior Publication Data
US 2019/0383251 A1    Dec. 19, 2019

Related U.S. Application Data

(62) Division of application No. 14/912,303, filed as application No. PCT/US2014/051117 on Aug. 14, 2014, now Pat. No. 10,428,775.

(30) Foreign Application Priority Data

Aug. 19, 2013  (IN) .............................. 3664CHE2013
Oct. 3, 2013   (IN) .............................. 4479CHE2013

(51) Int. Cl.
*F02M 37/22*    (2019.01)
*B01D 29/90*    (2006.01)
(Continued)

(52) U.S. Cl.
CPC ............. *B01D 29/21* (2013.01); *B01D 29/90* (2013.01); *B01D 35/005* (2013.01);
(Continued)

(58) Field of Classification Search
CPC ...... B01D 29/21; B01D 29/90; B01D 35/005; B01D 35/306; B01D 2201/0415;
(Continued)

(56) References Cited

U.S. PATENT DOCUMENTS 4,976,852 A    12/1990  Janik et al.
5,180,490 A *   1/1993  Eihusen ................. B01D 27/08
                                                      210/239

(Continued)

OTHER PUBLICATIONS

International Search Report and Written Opinion for PCT/US2014/051117, dated Nov. 24, 2014, 11 pages.

*Primary Examiner* — Madeline Gonzalez
(74) *Attorney, Agent, or Firm* — Foley & Lardner LLP

(57) ABSTRACT

A no filter no run (NFNR) fluid filter and fluid filter assembly are provided. The NFNR fluid filter assembly includes a fluid filter, a filter head or filter housing, and a bypass flow path. The bypass flow path may be sealed off when a compliant filter is installed. When a non-compliant filter is installed (a filter without a bypass seal), fluid may flow to the bypass flow path.

14 Claims, 16 Drawing Sheets

(51) Int. Cl.
 *B01D 35/00* (2006.01)
 *B01D 35/30* (2006.01)
 *B01D 29/21* (2006.01)
 *F02M 37/36* (2019.01)
 *F02M 37/54* (2019.01)

(52) U.S. Cl.
 CPC ........... *B01D 35/306* (2013.01); *F02M 37/36* (2019.01); *F02M 37/54* (2019.01); *B01D 2201/0415* (2013.01); *B01D 2201/291* (2013.01); *B01D 2201/347* (2013.01)

(58) Field of Classification Search
 CPC ........ B01D 2201/291; B01D 2201/347; B01D 35/14; B01D 35/30; B01D 2201/29; B01D 2201/30; B01D 2201/301; B01D 2201/304; B01D 2201/34; B01D 35/147; B01D 2201/4046; B01D 2201/4061; B01D 2201/4023; B01D 2201/40; B01D 2201/31; B01D 2201/316; F02M 37/36; F02M 37/54
 USPC ....... 210/436, 450, 130, 133, 435, 441–444, 210/437–438, 457, 493.2
 See application file for complete search history.

(56) References Cited

U.S. PATENT DOCUMENTS

| | | | |
|---|---|---|---|
| 5,858,227 A | | 1/1999 | Stone |
| 6,085,915 A | * | 7/2000 | Schwandt ............. B01D 29/21 210/411 |
| 8,276,763 B2 | | 10/2012 | Shaam |
| 8,501,003 B2 | | 8/2013 | Allott et al. |
| 2006/0053756 A1 | | 3/2006 | Hawkins et al. |
| 2010/0193417 A1 | * | 8/2010 | Gohl ...................... B01D 27/08 210/130 |

* cited by examiner

NO FILTER NO RUN FLUID FILTER WITH INTEGRATION OF LOW PRESSURE FLUID SYSTEM

CROSS-REFERENCE TO RELATED APPLICATIONS

This application is a divisional of U.S. patent application Ser. No. 14/912,303, filed Feb. 16, 2016, which is the U.S. national phase of PCT Application No. PCT/US2014/051117, filed Aug. 14, 2014, which claims priority to and the benefit of Indian Patent Application No. 4479/CHE/2013, filed Oct. 3, 2013 and Indian Patent Application No. 3664/CHE/2013, filed Aug. 19, 2013, the entire disclosures of which are incorporated herein by reference.

FIELD

Embodiments of this disclosure relate generally to a fluid filtration system for an internal combustion engine. More specifically, the embodiments relate to a no filter no run (NFNR) fluid filter on a low pressure side fluid filtration system of an engine.

BACKGROUND

A filter element in a fluid filtration system is often designed with specific filtration efficiency requirements. Accordingly, the filter is generally designed to meet such requirements. An incorrect filter often may fit the application, but may not meet the specific filtration efficiency requirements. As a result, the use of an incorrect filter in a fluid filtration system can lead to premature engine failure and, in some instances, increased warranty claims. A no filter no run (NFNR) feature can be included in a filter housing, the feature preventing flow of fluid to an engine or fuel injection system if: (1) no filter is installed, or if (2) an incorrect filter is installed, Accordingly, in a system incorporating an NFNR feature, to provide a sufficient amount of fluid to the engine, the correct filter must be installed.

SUMMARY

Embodiments of this disclosure relate generally to a fluid filtration system for an internal combustion engine. More specifically, the embodiments relate to a no filter no run (NFNR) fluid filter on a low pressure side fluid filtration system of an engine.

In some embodiments, a fluid filtration system having an NFNR fluid filter includes a fuel filtration system (e.g., for a diesel or gasoline engine, etc.), a hydraulic fluid filtration system, an oil filtration system, an air filtration system, a water filtration system, or other similar fluid filtration system. The fluid filtration system may, in some embodiments, include applications in which the filtration system is an engine application as well as in a filtration system that is not an engine application.

In some embodiments, an NFNR fluid filter may be integrated with a low pressure side fuel water separator or fuel filter. The NFNR fluid filter may make it easier to prime a fuel system. In some embodiments, the NFNR fluid filter may improve air venting in a fuel system.

In some embodiments, a filter head or filter housing includes a bypass port. The bypass port may be connected in fluid communication with a fluid pump, a fluid tank, or a fluid return line. A correct fluid filter includes a bypass seal, which when installed to the filter head or filter housing may prevent fluid from flowing to the bypass loop. In other words, when a filter is installed with a bypass seal it plugs or seals the bypass loop. When a filter having a bypass seal is installed, the bypass seal is in sealing engagement with a surface of the filter head or filter housing. The sealing engagement may prevent fluid from flowing to the bypass loop.

In some embodiments, the bypass port may be connected in fluid communication with an inlet of a fluid transfer pump (e.g., a low pressure fuel pump, etc.). In some embodiments, the bypass port may be connected in fluid communication with a fluid return line (e.g., fuel return line, etc.). In some embodiments, the bypass port may be connected in fluid communication with a fluid tank (e.g., fuel tank, etc.).

In some embodiments, a bypass seal is added to a filter such that, when installed, a seal may be formed between the filter and the filter head or housing that prevents fluid flow through the bypass port. When a filter with the bypass seal feature is installed, fluid may be unable to flow from the bypass port and the fluid may flow toward a high pressure pump. The sealed bypass port may allow fluid to flow at a sufficient flow rate and pressure to the high pressure pump such that a connected engine may be started and/or run.

In some embodiments, when a filter without the bypass seal feature is installed, the bypass loop may not be sealed and a portion of the fuel will flow out of the bypass port toward a fluid transfer pump, a fluid tank, or a fluid return line. In such embodiments, the pressure and flow rate of the fluid flowing to the high pressure pump may be insufficient to start and/or run the engine.

In some embodiments, an open endplate and dual seal may be injection molded and may be molded in one piece.

In some embodiments, a bypass seal may be added to a filter housing such that, when a correct filter is installed, a seal may be formed between the filter and the filter housing that prevents fluid flow through the bypass port. In some embodiments, a bypass seal may be added to a filter head such that, when a correct filter is installed, a seal may be formed between the filter and the filter housing that prevents fluid flow through the bypass port. In other embodiments, a bypass seal may be added to a standpipe in order to prevent fluid flow through the bypass port when a correct filter is installed.

According to one embodiment, a fluid filter including a filter media having a filtered fluid side and an unfiltered fluid side, a first end plate, a second end plate, and a bypass seal is provided. The filter media is disposed between the first end plate and the second end plate. The fluid filter is configured to be engaged with a filter head or filter housing. The filter head or filter housing may include a bypass flow outlet, and the bypass seal may be configured to block fluid flow to the bypass flow outlet when the fluid filter is engaged with the filter head or filter housing. The filter media may be cylindrical. The fluid filter includes an internal seal configured to seal against the filter head or filter housing and separate an unfiltered fluid from a filtered fluid. The internal seal is located on the first endplate. The fluid filter may further include an air vent valve configured to vent air from the fluid filter. The bypass seal may be located on the first endplate. The second end plate may be a closed end plate. The first end plate may include a filtered fluid outlet.

According to another embodiment, a fluid filter assembly including a fluid filter and a filter head is provided. The fluid filter includes a filter media having a filtered fluid side and an unfiltered fluid side, a first end plate, a second end plate, and a bypass seal. The filter head includes a fluid inlet, a fluid outlet, and a bypass flow passage. The filter media is disposed between the first end plate and the second end plate. The fluid filter is configured to engage the filter head. The bypass seal is configured to block fluid flow to the bypass flow passage when the fluid filter is engaged with the filter head. The fluid filter may further include an internal seal configured to seal against the filter head and separate an unfiltered fluid from a filtered fluid. The internal seal may be located on the first endplate. The fluid filter assembly may further include an air vent valve configured to vent air from the fluid filter assembly. The bypass seal may be located on the first endplate. The second end plate may be a closed end plate. The first end plate may include a filtered fluid outlet configured to supply filtered fluid to the fluid outlet of the filter head. The fluid filter assembly may include a filter housing configured to engage the filter head and enclose the fluid filter. The fluid outlet may be configured to supply filtered fuel to an engine. The bypass flow path may be configured to supply a bypass fluid flow to at least one of a fuel tank or a fuel transfer pump. The fluid filter may be a fuel filter, and the bypass flow path may be configured such that in the absence of a correct fluid filter with a bypass seal the amount of fuel that flows through the fluid outlet is insufficient to start or run an engine. The fluid filter may be a fuel filter, and the bypass flow path may be configured such that when the bypass seal blocks fuel flow through the bypass flow path the amount of fuel that flows through the fluid outlet is sufficient to start or run an engine.

According to one embodiment a fluid filter cartridge including a filter media having a filtered fluid side and an unfiltered fluid side, a first end plate, a second end plate, and a bypass seal. The filter media may be cylindrical and disposed between the first end plate and the second end plate. The fluid filter is configured to be disposed within a filter housing including a bypass flow outlet. The bypass seal is configured to block fluid flow to the bypass flow outlet when the fluid filter is disposed in the filter housing. The fluid filter cartridge may further include an internal seal. The internal seal may be disposed on the first end plate, and the bypass seal may be disposed on the second end plate. The fluid filter cartridge may further include a center tube extending between the first endplate and the second endplate. The center tube may include the bypass seal. The first endplate may include an opening configured to engage a standpipe of the filter housing. The first endplate may be a closed endplate and the bypass seal may be disposed on an internal surface of the first endplate. The fluid filter cartridge may further include a drain seal configured to block fluid flow to a drain of the filter housing when the fluid filter is disposed in the filter housing.

According to another embodiment a fluid filter assembly including a fluid filter cartridge and a filter housing is provided. The fluid filter cartridge includes a filter media having a filtered fluid side and an unfiltered fluid side, a first end plate, a second end plate, and a bypass seal. The filter housing includes a housing cover, a housing base, a fluid inlet, a fluid outlet, and a bypass flow outlet. The filter media may be cylindrical and disposed between the first end plate and the second end plate. The fluid filter cartridge may be configured to be disposed within the filter housing. The bypass seal may be configured to block fluid flow to the bypass flow outlet when the fluid filter is disposed in the filter housing. The housing base may further include a standpipe. The standpipe may include the bypass flow path and a fluid outflow path configured to supply fluid flow to the fluid outlet. The standpipe may include tapered walls configured to engage the bypass seal. The housing base may further include a drain outlet, and the fluid filter cartridge may further include a drain seal. The standpipe may include a plurality of apertures forming a drain outlet. The filter housing may further include a plurality of structures, and the filter cartridge may further include a plurality of surfaces configured to engage the plurality of structures such that the fluid filter cartridge is properly located within the filter housing. The fluid outlet may be configured to supply filtered fuel to an engine. The bypass flow path may be configured to supply a bypass fluid flow to at least one of a fuel tank or a fuel transfer pump. The fluid filter may be a fuel filter, and the bypass flow path may be configured such that in the absence of a correct fluid filter with a bypass seal the amount of fuel that flows through the fluid outlet is insufficient to start or run an engine. The fluid filter may be a fuel filter, and the bypass flow path may be configured such that when the bypass seal blocks fuel flow through the bypass flow path the amount of fuel that flows through the fluid outlet is sufficient to start or run an engine. The housing base may be configured to connect to the housing cover by a threaded connection, and a leak seal may be disposed between the housing base and the housing cover.

According to one embodiment a fluid filter including a filter media having a filtered fluid side and an unfiltered fluid side, a first end plate, a second end plate, a bypass seal, an outer shell closed at a first end, and a nutplate disposed at an open end of the outer shell is provided. The filter media is disposed between the first end plate and the second end plate. The fluid filter is configured to be engaged with a filter head, the filter head including a bypass flow outlet. The bypass seal is configured to block fluid flow to the bypass flow outlet when the fluid filter is engaged with the filter head. The fluid filter may further include a spring to maintain a desired location of the filter media within the fluid filter. The fluid filter may further include a leak seal configured to engage the filter head. The fluid filter may further include a center tube extending between the first end plate and the second end plate. The nutplate may include a first plurality of apertures and a second plurality of apertures, wherein the first plurality of apertures are fluid inlets, the second plurality of apertures are fluid outlets, and the second plurality of apertures are located radially inward from the first plurality of apertures. The fluid filter may further include an internal seal disposed on the nutplate configured to seal against a surface of the filter head and separate filtered fluid from unfiltered fluid. The bypass seal may be disposed on the nutplate radially inward form the internal seal.

According to another embodiment, a fluid filter assembly including a fluid filter and a filter head is provided. The fluid filter includes a filter media having a filtered fluid side and an unfiltered fluid side, a first end plate, a second end plate, a bypass seal, an outer shell closed at a first end, and a nutplate disposed at an open end of the outer shell. The filter head includes a fluid inlet, a fluid outlet, and a bypass flow outlet. The filter media is disposed between the first end plate and the second end plate. The fluid filter is configured to engage with the filter head, and the bypass seal may be configured to block fluid flow to the bypass flow outlet when the fluid filter is engaged with the filter head. The filter head may further include a mounting boss configured to connect to the nutplate. The mounting boss may be threadably connected to the nutplate. The fluid outlet may be configured to supply filtered fuel to an engine. The bypass flow path may be configured to supply a bypass fluid flow to at least one of a fuel tank or a fuel transfer pump. The fluid filter may be a fuel filter, and the bypass flow path may be configured such that in the absence of a correct fluid filter with a bypass seal the amount of fuel that flows through the fluid outlet is insufficient to start or run an engine. The fluid filter may be a fuel filter, and the bypass flow path may be configured such that when the bypass seal blocks fuel flow through the bypass flow path the amount of fuel that flows through the fluid outlet is sufficient to start or run an engine.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Embodiments of this disclosure relate generally to a fluid filtration system for an internal combustion engine. More specifically, the embodiments relate to a no filter no run (NFNR) fluid filter on a low pressure side fluid filtration system of an engine.

An NFNR fluid filtration system including a bypass loop is provided. An NFNR filter may include a bypass seal. A filter head or filter housing may include a surface for receiving the bypass seal in sealing engagement. When the filter is installed in the NFNR fluid filtration system, the bypass seal may prevent a bypass loop from receiving fluid via a bypass port. The bypass loop may be in fluid communication with a fluid transfer pump, a return fluid line, or a fluid tank. When the bypass loop is sealed, the fluid pressure and flow rate of the fluid to a high pressure pump may be sufficient to start and run an engine. When a filter without the bypass seal is installed, the bypass loop remains in fluid communication with the filter. Accordingly, the bypass loop receives some portion of the fluid. As a result, the fluid pressure and flow rate of the fluid to the high pressure pump may be insufficient to start and run the connected engine.

In the various embodiments described herein, the bypass seal may be located on or within a fluid filter, a fluid filter housing, a fluid filter head, a standpipe, or other component of a fluid filter assembly. Further, the location of the bypass seal on or within each component may vary. For example, the bypass seal may be located on an end portion of a standpipe in some embodiments and in a central portion of a standpipe in other embodiments.

A fuel filtration system and corresponding fuel filters are discussed by way of example herein. The embodiments, aspects, and concepts described may apply to fluid filtration systems other than fuel filtration. Other filtration systems, fir example, include oil filtration, hydraulic fluid filtration, coolant filtration, or the like.

A "compliant filter" may be, for example, a fluid filter configured to seal a bypass flow path, In some embodiments, a compliant filter may include a bypass seal. A compliant filter may also be referred to as a correct filter.

A "non-compliant filter" may be, for example, a fluid filter that is not configured to seal a bypass flow path. In some embodiments, a non-compliant filter may not include a bypass seal, A non-compliant filter may also be referred to as an incorrect filter.

Figure 1:
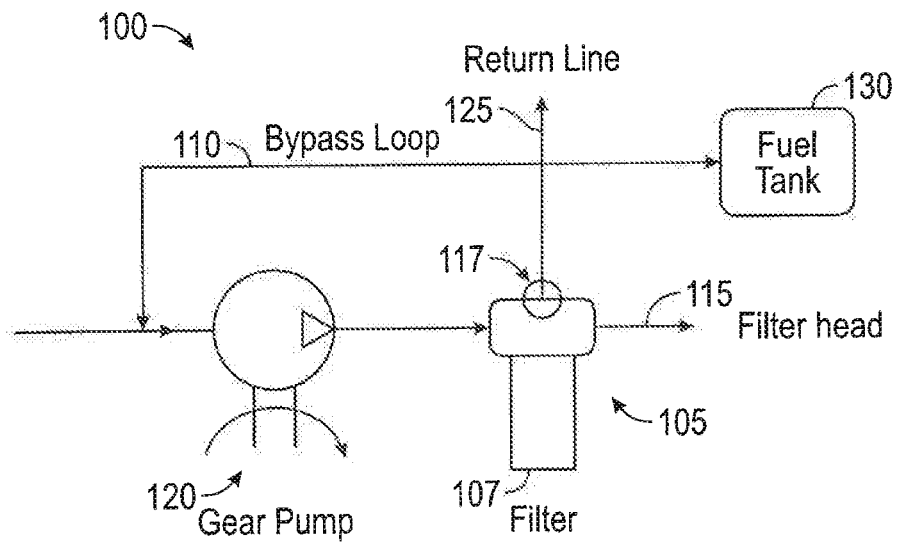
FIG. 1 illustrates a fluid filtration system including a no filter no run (NFNR) filter with a bypass loop, according to some embodiments.

FIG. 1 illustrates a fluid filtration system 100 including a no filter no run (NFNR) fluid filter assembly 105 including a bypass loop 110, according to some embodiments. The NFNR fluid filter assembly 105 includes a filter 107 and a filter head 115. The filter head 115 may also represent a filter housing. The filter 107 may, fear example, represent a fuel filter, A fuel filter may filter hydrocarbon based fuels (e.g., diesel fuel, etc.). The filter head 115 includes a bypass port 117 to connect the NFNR fluid filter assembly 105 to the bypass loop 110.

The filter 107 may include a bypass seal (discussed in further detail in accordance with FIGS. 2-7 below). The bypass seal may prevent fluid from flowing through the bypass port 117 to the bypass loop 110. If a filter is installed that does not include the bypass seal, some portion of the fluid flowing through the filter 107 may flow through the bypass loop. If fluid is flowing through the bypass loop, the pressure and flow rate of the fluid flowing to a high pressure pump (not shown in FIG. 1) may be insufficient for operation of an engine. In some embodiments, the high pressure pump may not be connected to an engine, in which case the pressure and flow rate are insufficient for operation of the connected system.

The bypass loop 110 may be connected to the inlet of pump 120, a return fluid line 125, or a fluid tank 130.

The pump 120 is a low pressure fluid transfer pump for providing fluid at a low pressure to the NFNR fluid filter assembly 105.

Figure 2:
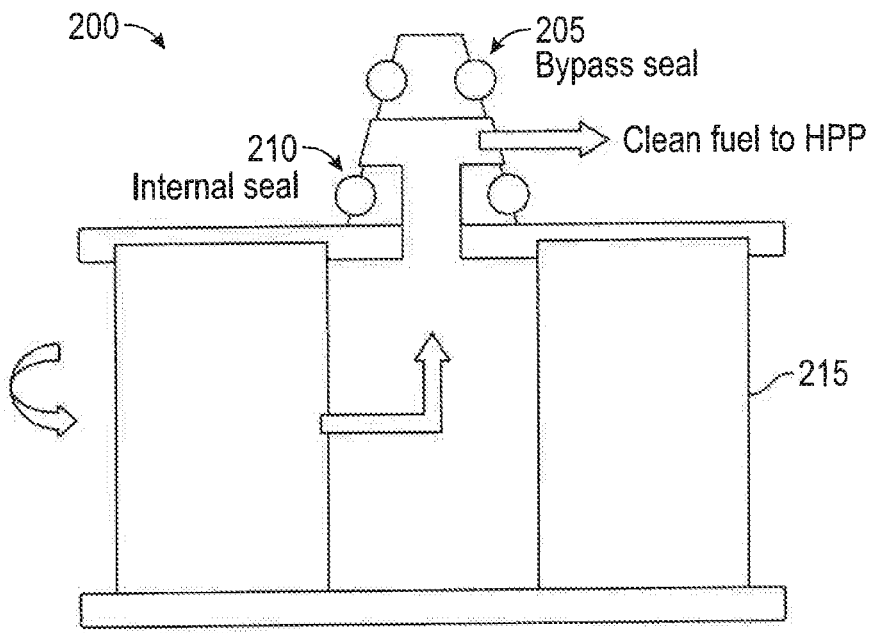
FIG. 2 illustrates a filter configured for use in the NFNR fluid filter assembly of FIG. 1, according to some embodiments.

FIG. 2 illustrates a filter 200 configured for use in the NFNR fluid filter assembly 105 of FIG. 1, according to some embodiments. The filter 200 includes a bypass seal 205, an internal seal 210, and a filter media 215.

The bypass seal 205 may be configured such that when installed to the NFNR fluid filter assembly 105, the bypass seal 205 is in sealing engagement with a surface of the filter head 115. As illustrated, the filter 200 is a spin-on filter. The filter 200 may include a variety of filter types. For example, in some embodiments, the fuel filter 215 may be a cartridge filter, a filter-in-filter, or other similar type of filter.

The internal seal 210 may be configured to prevent mixing of a filtered and an unfiltered fluid.

Figure 3:
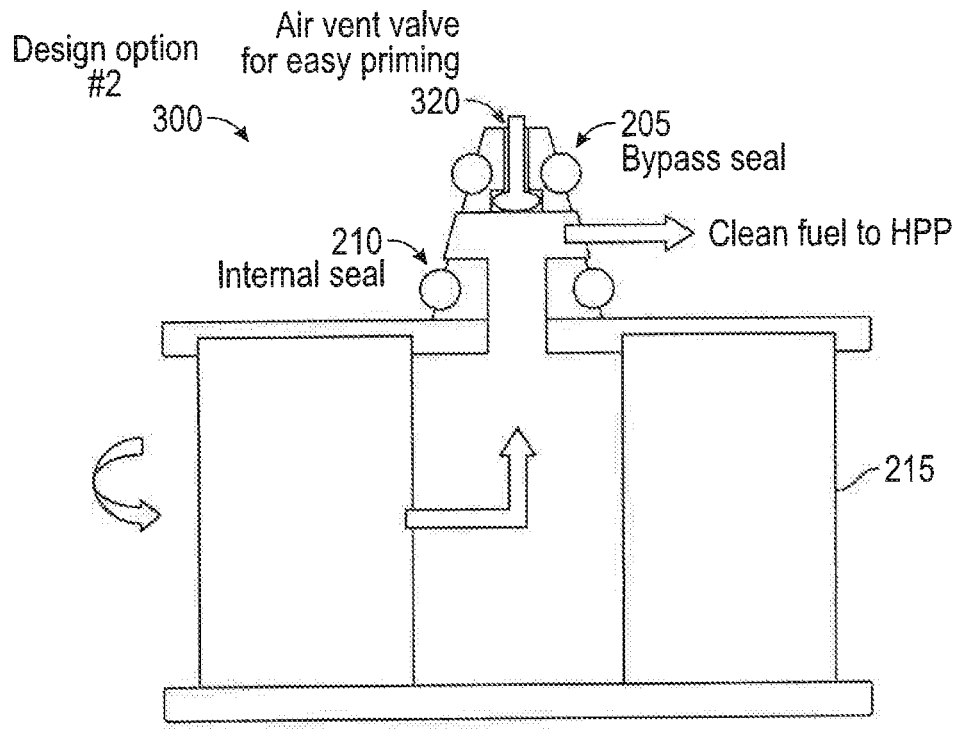
FIG. 3 illustrates a filter configured for use in the NFNR fluid filter assembly of FIG. 1, according to some embodiments.

FIG. 3 illustrates a filter 300 configured for use in the NFNR fluid filter assembly 105 of FIG. 1, according to some embodiments. Aspects of FIG. 3 may be the same as or similar to aspects of FIG. 2. In addition to a bypass seal 205, an internal seal 210, and a filter media 215, the filter 300 includes a floating valve 320 at the interface between the filter 300 and the bypass port 117. The floating valve 320 may be open when pressurized fluid is not in the system. The floating valve 320 allows air to escape as the fluid pressure increases, which can provide additional air venting. In some embodiments, this may reduce air in the fluid filtration system. When pressurized fluid fills up the pocket, the float will move up and seal the air venting hole. In addition to allowing air to escape, the floating valve 320 may make it easier to prime the system by allowing the addition of fluid from the top prior to pressurizing the fluid filtration system.

Figure 4:
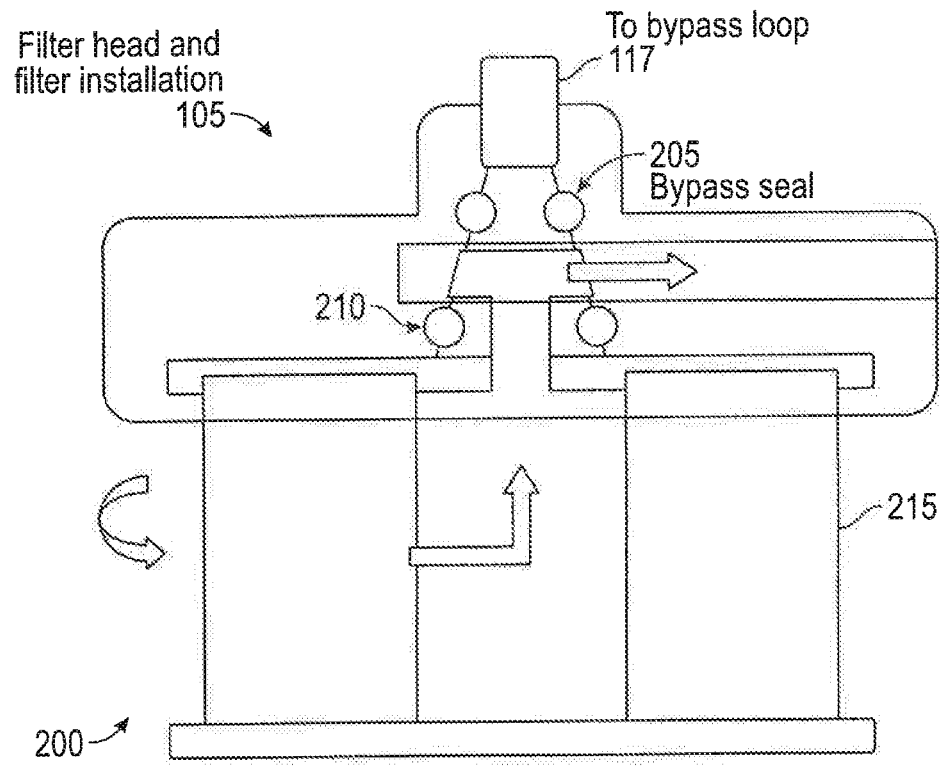
FIG. 4 illustrates a more detailed view of the NFNR, fluid filter assembly of FIG. 1, according to some embodiments.

FIG. 4 illustrates a more detailed view of the NFNR fluid filter assembly 105 shown in FIG. 1, according to some embodiments. Aspects of FIG. 4 may be the same as or similar to aspects of FIGS. 1-3. The filter head 115 is illustrated with the filter 200 (FIG. 2) installed. The filter head 115 includes the bypass port 117. The bypass port 117 connects the NFNR fluid filter assembly 105 in fluid communication with the bypass loop 110. As illustrated, a filter with the bypass seal 205 is installed. Accordingly, as illustrated, the bypass loop 110 is sealed off from the NFNR fluid filter assembly 105.

Figure 5:
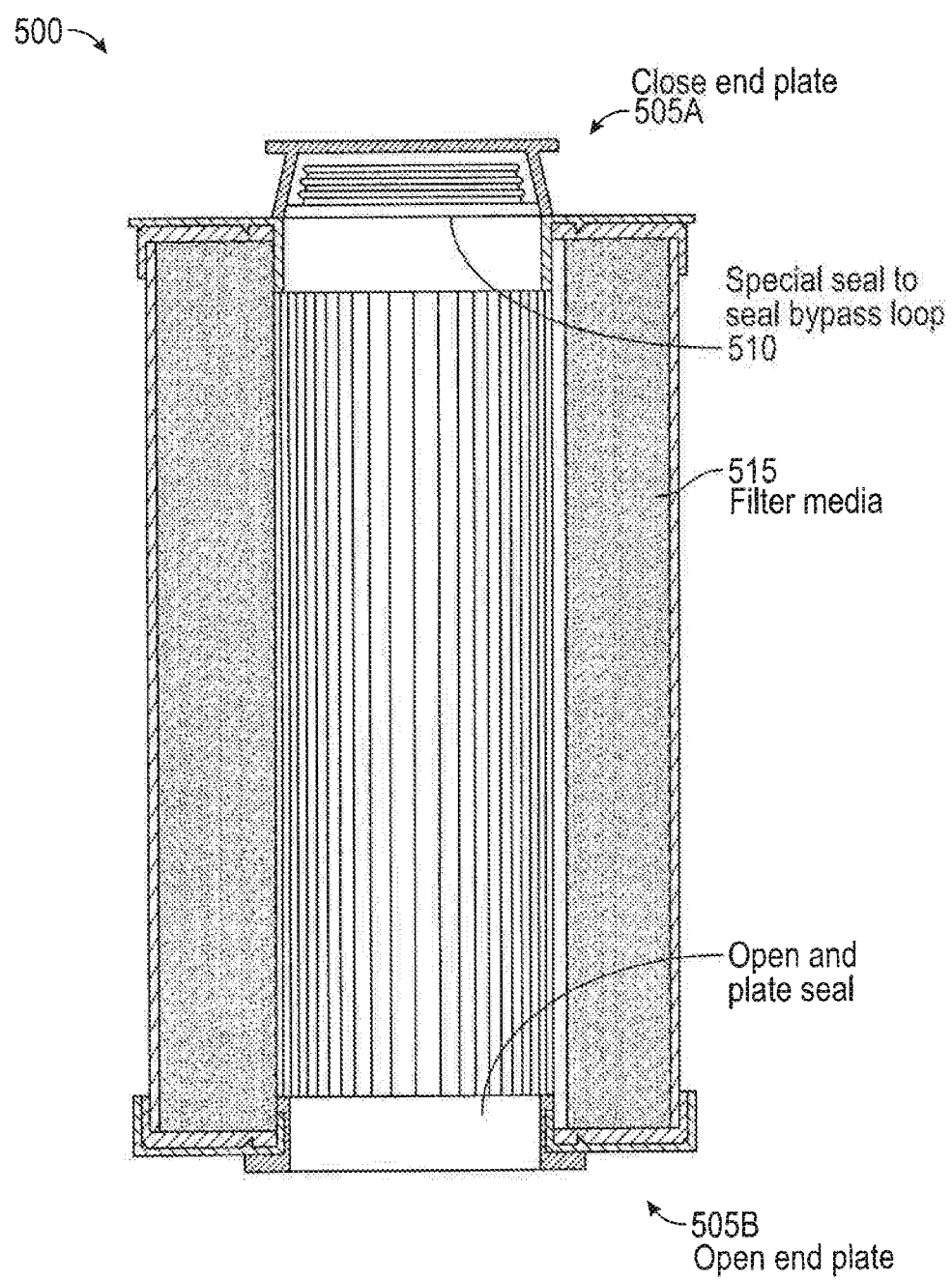
FIG. 5 illustrates a filter cartridge for use in an NFNR fuel filtration system, according to some embodiments.

FIG. 5 illustrates a filter cartridge 500 for use in an NFNR fuel filtration system, according to some embodiments. The filter cartridge 500 includes a closed endplate 505A and an open endplate 505B. The filter cartridge 500 includes a filter media 515. The filter media 515 is designed to remove unwanted contaminants from the fluid being filtered. The filter cartridge 500 includes a bypass seal 510. In some embodiments, the bypass seal 510 may be an O-ring, radial seal, or other suitable type of seal to prevent fluid flow. The bypass seal 510 is added inside the closed endplate 505A. When installed in a NFNR fluid filtration system, the bypass seal 510 may prevent fluid communication with a bypass loop (not shown in FIG. 5). An exemplary bypass loop is discussed in accordance with FIGS. 6 and 7 below.

Figure 6:
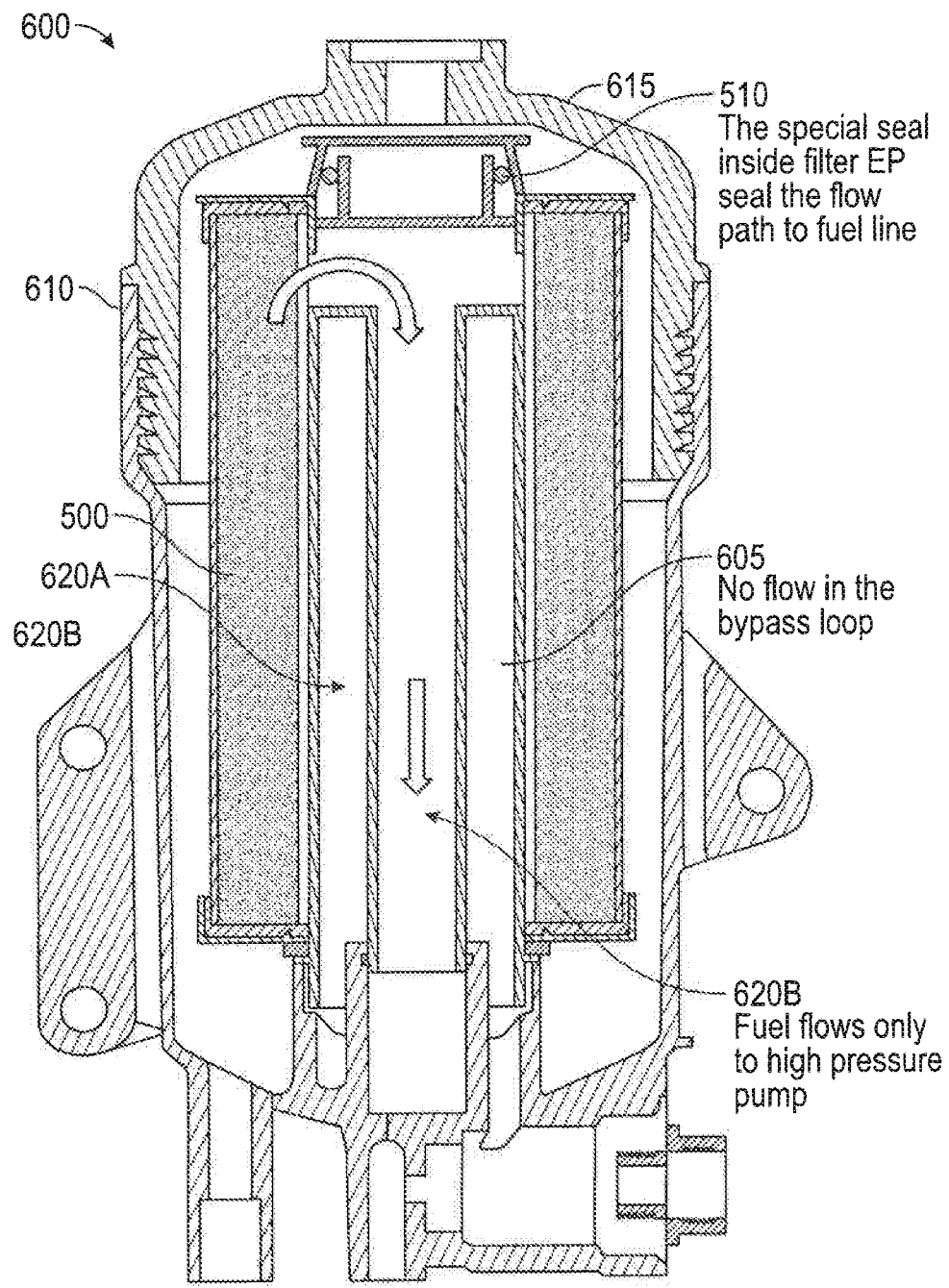
FIG. 6 illustrates an NFNR fluid filter assembly including the filter cartridge shown in FIG. 5 having a bypass seal, according to some embodiments.

FIG. 6 illustrates an NFNR fluid filter assembly 600 including the filter cartridge 500 (FIG. 5) having the bypass seal 510, according to some embodiments. The NFNR fluid filter assembly 600 includes a bypass loop 605. As illustrated, the bypass loop 605 is located in the center of the filter housing 610. A center post 615 provides a sealing surface. When installed, the bypass seal 510 of the filter cartridge 500 is in sealing engagement with the seating surface of the center post 615. The filter housing 610 includes two flow paths. A first flow path 620A is in the bypass loop 605. The first flow path 620A may provide fuel to a fuel tank (not shown in FIG. 6), a fuel transfer pump (not shown in FIG. 6), or a return fuel line (not shown in FIG. 6). A second flow path 620B may provide fluid to a high pressure pump (not shown). When the filter cartridge 500 having the bypass seal 510 is installed in the filter housing 610, the bypass seal 510 prevents fluid communication with the bypass loop 605. Accordingly, fluid can flow through the second path 620B to the high pressure pump at a fluid pressure and fluid flow rate that is sufficient for normal operation of an engine.

Figure 7:
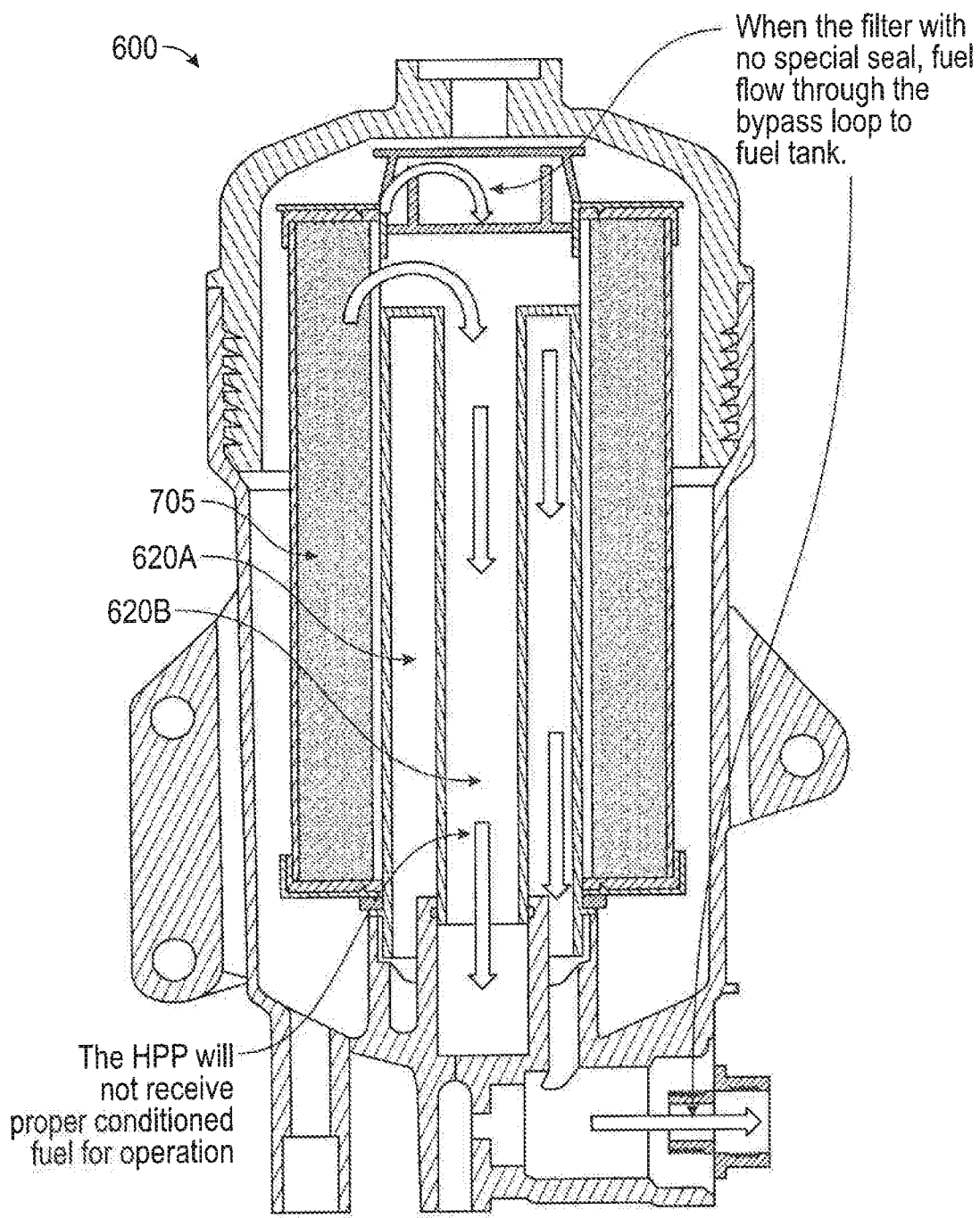
FIG. 7 illustrates the NFNR fluid filter assembly of FIG. 6 including a filter cartridge that lacks a bypass seal, according to some embodiments.

FIG. 7 illustrates the NFNR fluid filter assembly 600 including a filter cartridge 705 that lacks a bypass seal, according to some embodiments. Aspects of FIG. 7 may be the same as or similar to aspects of FIG. 6. FIG. 7 shows fluid flow through the first flow path 620A and the second flow path 620B. Fluid is able to flow via the first flow path 620A and the second flow path 620B because a filter cartridge 705 is installed that does not include a bypass seal. Because the filter cartridge 705 does not include a bypass seal, the bypass loop 605 receives some portion of the fluid being filtered. Accordingly, the fluid may not be provided to the high pressure pump at a sufficient pressure and flow rate for operation of the engine.

Figure 8A:
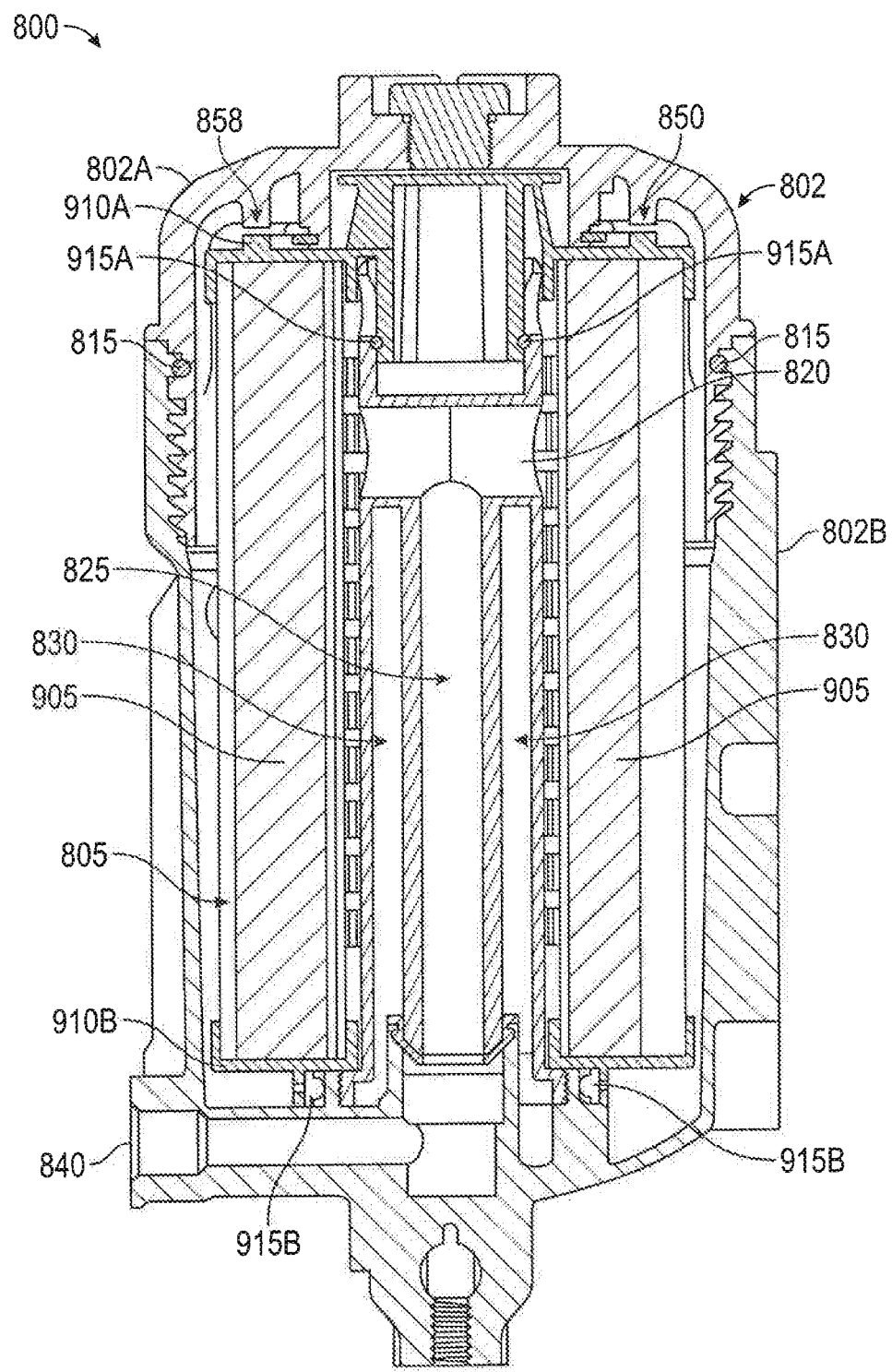
FIGS. 8A and 8B illustrate side cross-sectional views of an NFNR fluid filter assembly including a filter housing with an installed fluid filter, according to some embodiments.
Figure 8B:
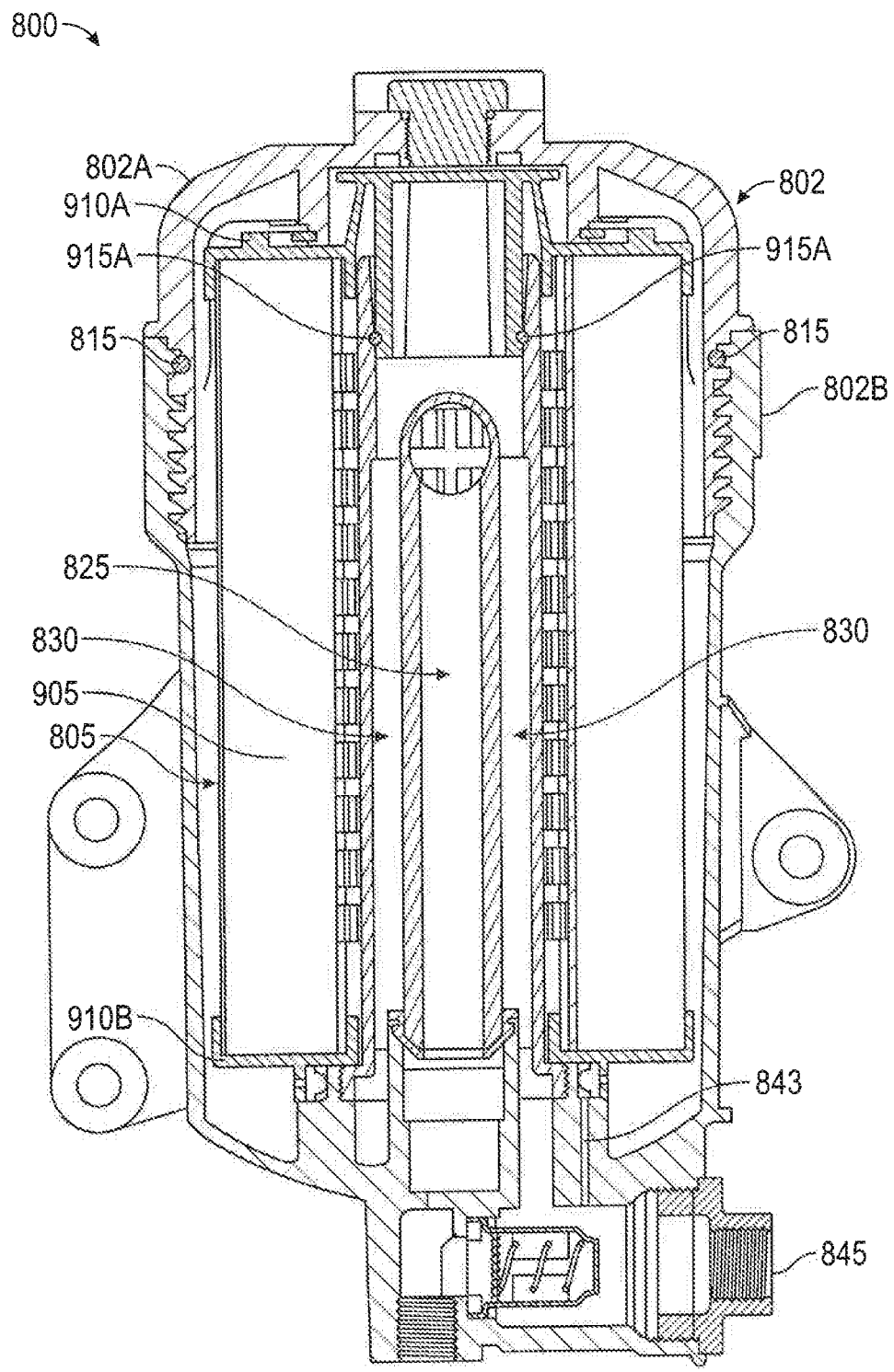

FIGS. 8A and 8B illustrate an NFNR fluid filter assembly 800 including a filter housing 802 with an installed fluid filter 805, according to some embodiments. The fluid filter 805 is a cartridge type fluid filter and may, for example, be referred to as a filter cartridge. Generally, the NFNR fluid filter assembly 800 is configured and arranged such that when a non-compliant filter (e.g., lacking a bypass seal, etc.) is installed, a fluid output from the filter housing 802 is at a pressure and flow rate that are insufficient to, for example, run an internal combustion engine. A flow path of the fluid being filtered in the NFNR fluid filter assembly 800 is determined based on whether a compliant or a non-compliant filter is installed. A flow path of the fluid being filtered in the NFNR fluid filter assembly 800 may also be determined based on whether a compliant filter is in an installed position or an uninstalled position.

As illustrated, the NFNR fluid filter assembly 800 may be used for removing a contaminant (e.g., solid particulates, water, etc.) from fuel (e.g., diesel fuel, etc.) before outputting the fuel to a high pressure pump (not shown) and consequently injecting the fuel into a combustion chamber of an internal combustion engine (not shown). Aspects of the NFNR fluid filter assembly 800 may be included in a fluid filtration system other than a fuel filtration system, such as oil filtration, hydraulic fluid filtration, coolant filtration, or the like. The NFNR fluid filter assembly 800 may be configured for use in applications that include an internal combustion engine as well as in applications that do not include an internal combustion engine.

The filter housing 802 includes a housing cover 802A and a housing base 802B. In some embodiments, a filter housing may also be referred to as a filter head. As illustrated in FIGS. 8A and 8B, the housing cover 802A and the housing base 802B may be securely connected, thereby creating an inner chamber in which the fluid filter 805 may receive an unfiltered fluid and output a filtered fluid. The housing cover 802A and the housing base 802B are threaded to form the secure connection. The housing cover 802A may be securely connected to the housing base 802B by other similar means, for example, with clips, screws, or other similar means of forming a secure connection that may be removed in order to, for example, remove and/or replace the fluid filter 805. A housing seal 815 is disposed at the interconnection between the housing cover 802A and the housing base 802B in order to prevent environmental contaminants (e.g., dirt, grease, rainwater, etc.) from entering the filter housing 802 and to prevent the fluid being filtered from leaking out of the filter housing 802. The housing seal 815 may, for example, be an O-ring, a radial seal, or the like.

The housing cover 802A includes a plurality of structures 850. The plurality of structures 850 are configured and arranged to provide a force to a plurality of surfaces 950 on a closed endplate of the fluid filter 805. The three may ensure that the fluid filter 805 is installed in the proper location when the housing cover 802A and the housing base 802B are securely connected.

The fluid filter 805 includes a filter media 905, the closed endplate 910A, an open endplate 910B, a bypass seal 915A, and a drain seal 915B. The fluid filter 805 may include additional features in some embodiments. For example, the closed endplate 910A may include an aperture to bleed gas (e.g., remove air from the fluid filtration system, etc.) from the NFNR fluid filter assembly 800. The fluid filter is described in additional detail in accordance with FIG. 9 below.

A standpipe 820 extends along the central axis of the fluid filter 805. The standpipe 820 includes a filtered fluid outflow path 825 and a bypass flow path 830. The bypass flow path 830 may also be referred to as a bypass loop or a bypass channel. As illustrated, the filtered fluid outflow path 825 is located along the central axis of the standpipe 820 and the bypass flow path 830 is located radially outward of the filtered fluid outflow path 825. Alternatively, the bypass flow path 830 can be located radially inward of the filtered fluid outflow path 825. The filtered fluid outflow path 825 provides a filtered fluid to a high pressure pump at the outlet 840 of the filter housing 802. The bypass flow path 830 is in fluid communication with a return outlet 845 that may return fluid to a fluid tank/reservoir.

The bypass flow path 830 is sealed to prevent fluid flow when a fluid filter 805 including the bypass seal 915A is installed in the filter housing 802. The filtered fluid outflow path 825 receives the filtered fluid when a compliant filter is installed in the filter housing 802. When a non-compliant filter is installed in the filter housing 802, the bypass seal 915A is not present to seal the bypass flow path 830. Accordingly, fluid flows through both the filtered fluid outflow path 825 and the bypass flow path 830. As a result, the fluid flow to the high pressure pump is at an insufficient pressure and flow rate to, for example, run an internal combustion engine. In other embodiments, the bypass seal 915A may be located on the standpipe 820 and form a seal with a surface on the fluid filter 805.

Figure 11A:
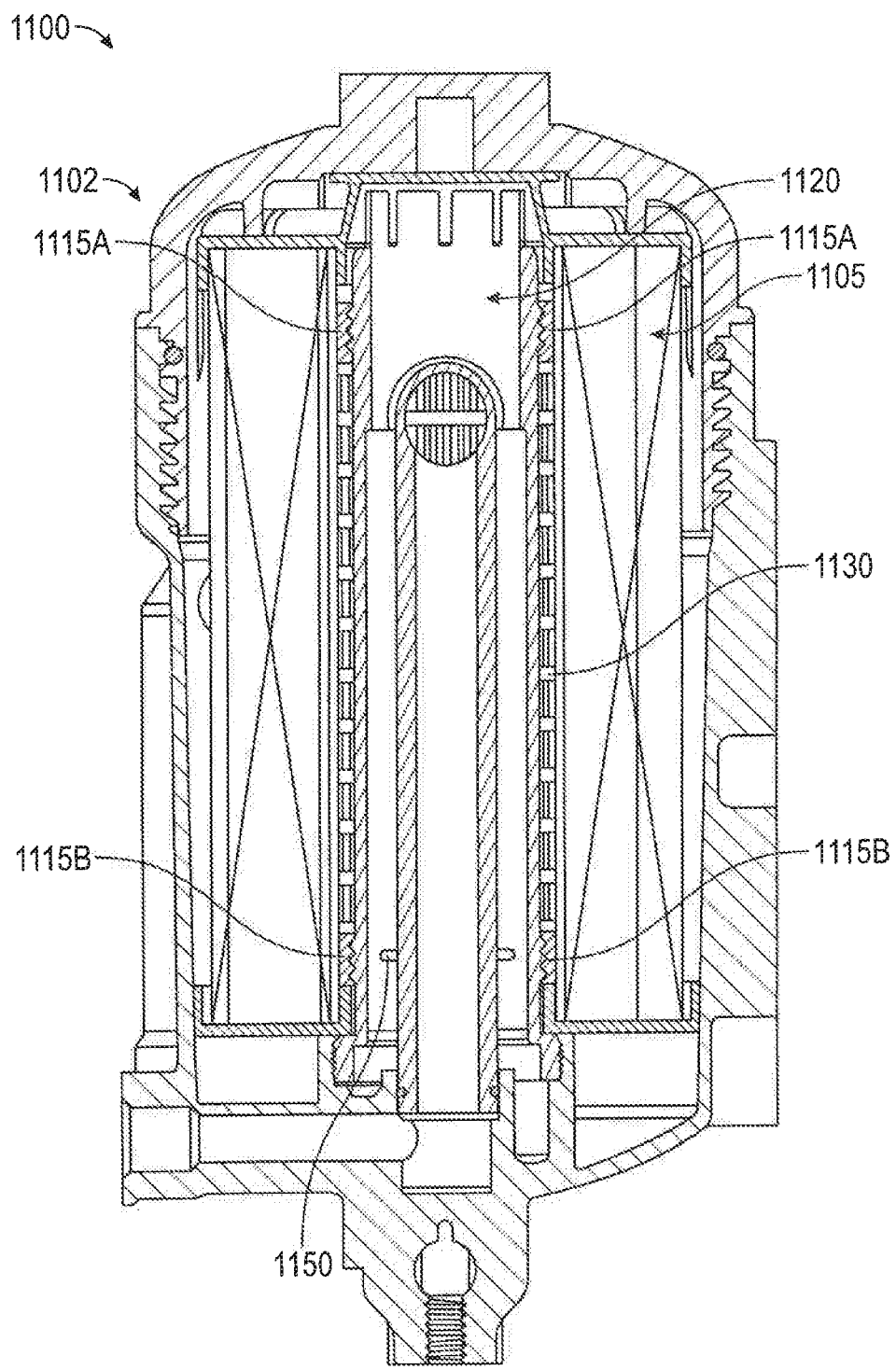
FIGS. 11A and 11B illustrate side cross-sectional views of an NFNR fluid filter assembly including a filter housing with an installed fluid filter, according to other embodiments.
Figure 11B:
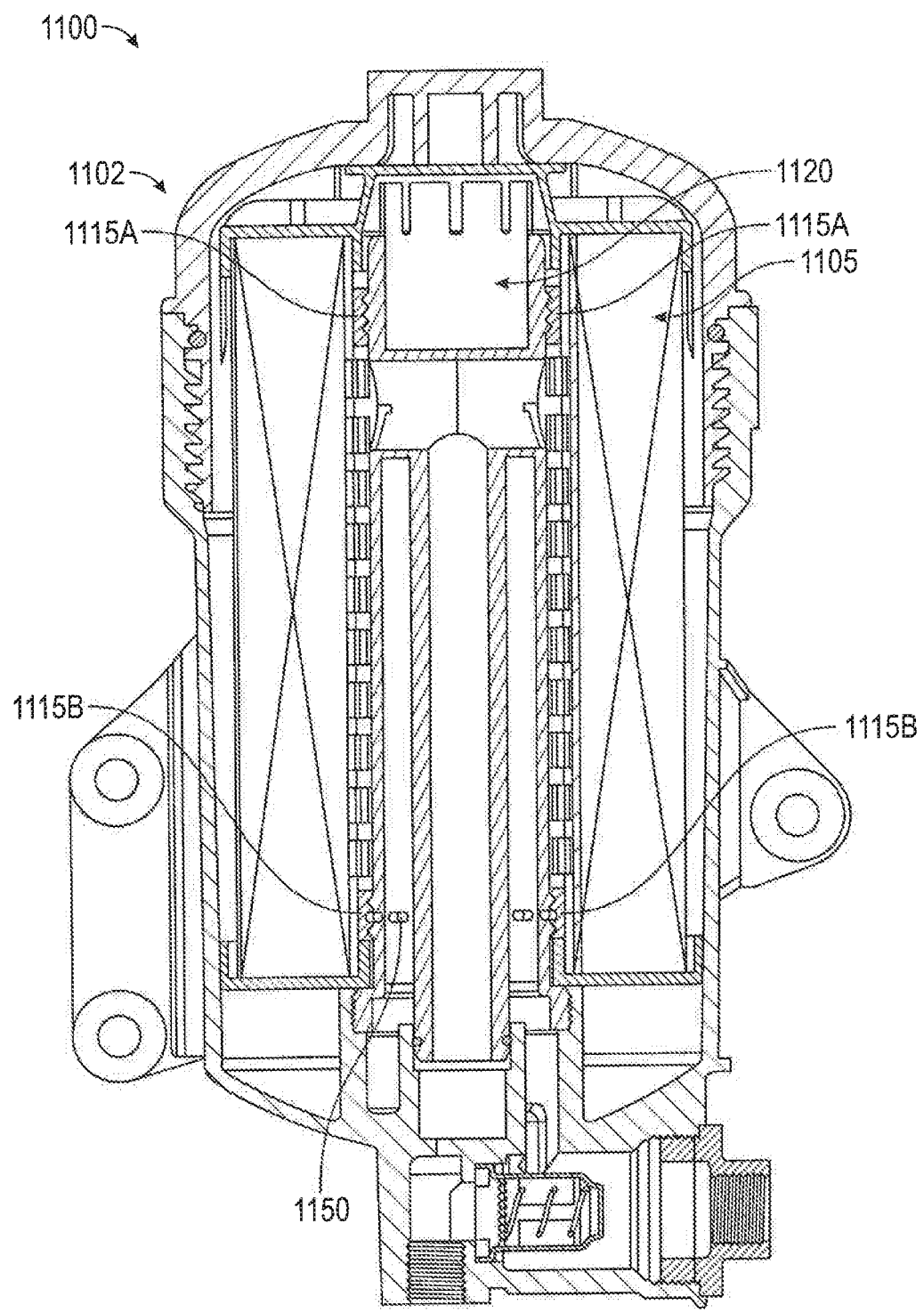

The filter housing 802 includes a drain 843. The drain 843 is configured and arranged to be sealed by the drain seal 915B when the fluid filter 805 is in the installed configuration. If the fluid filter 805 is removed from the filter housing 802, the drain seal 915B does not prevent fluid flow from the drain 843. Accordingly, when the fluid filter 805 is uninstalled, the fluid within the filter housing 802 drains to the fluid tank/reservoir via drain 843, which is in fluid communication with the return outlet 845. The drain seal 915B may be an O-ring, a radial seal, or the like. In some embodiments, the drain feature may be located on the standpipe 820 (e.g., a plurality of apertures (1150) as illustrated in FIGS. 11A and 11B). In other embodiments, the drain feature may be located between the standpipe 820 and the filter housing 802.

Figure 9:
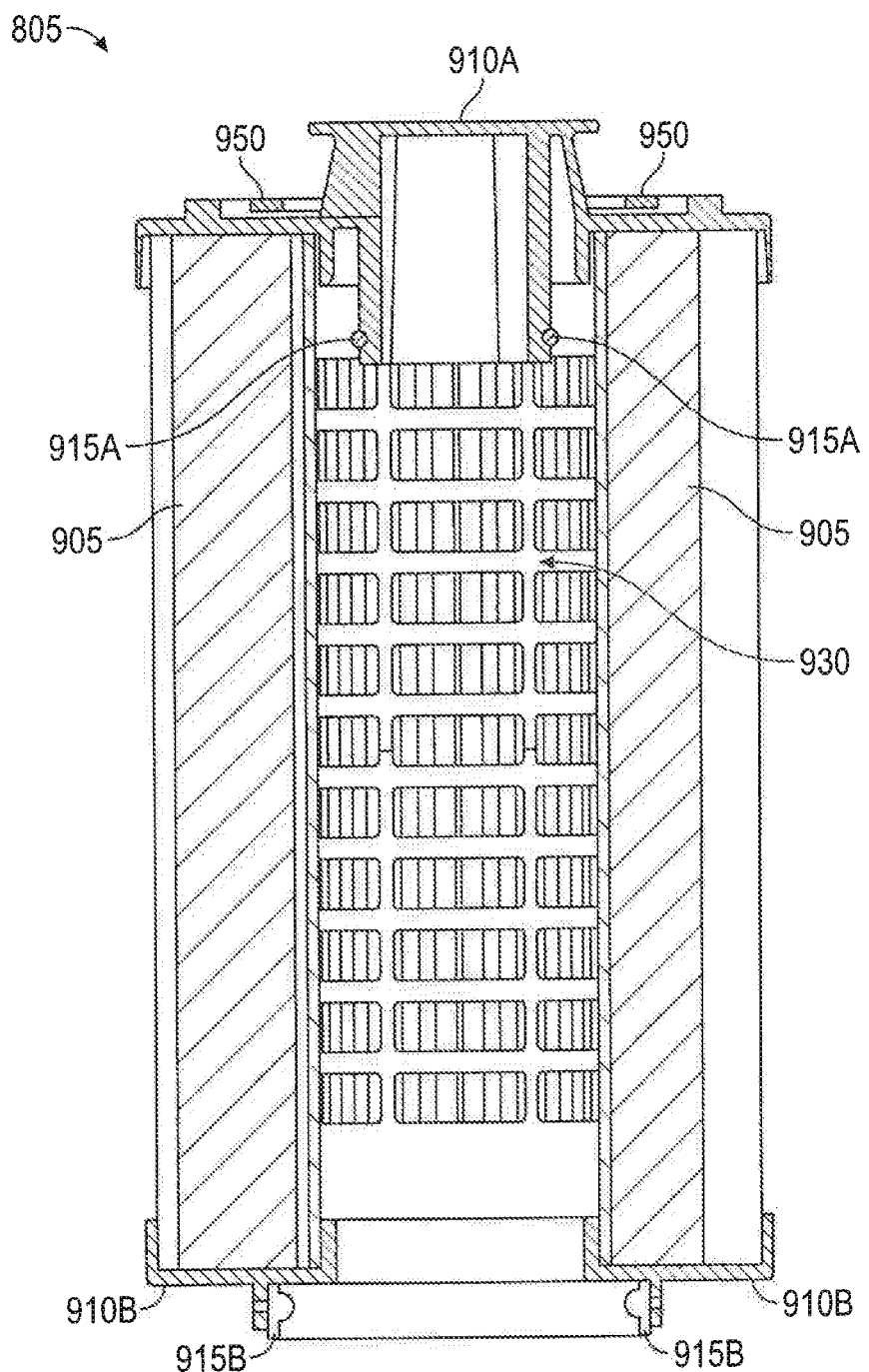
FIG. 9 illustrates a side cross-sectional view of the fluid filter of FIGS. 8A and 8B, according to some embodiments.

FIG. 9 illustrates a side cross-sectional view of the fluid filter 805, according to some embodiments.

The filter media 905 is generally configured to receive an unfiltered fluid, retain unwanted contaminants (e.g., solid particulates, water, etc.), and output a filtered fluid. The filter media 905 may, for example, be composed of paper, cardboard, felt, or other similar materials. The material for the filter media 905 may be dependent upon the type of fluid being filtered.

The fluid filter 805 includes a closed endplate 910A and an open endplate 910B. The endplates 910A and 910B provide structural support for the filter media 905. The filter media 905 may be attached to the endplates 910A and 910B in a variety of ways, including, but not limited to, embedding the filter media 905 into the endplates 910A and 910B or using an adhesive. The endplates 910A and 910B may be made of plastic or another suitable material that is compatible with the fluid being filtered.

The closed endplate 910A generally does not have any apertures through which fluid being filtered may flow. The closed endplate 910A may include an aperture through which gas (e.g., air) may be bled from the NFNR fluid filter assembly 800 and returned to, for example, a fluid tank/reservoir. In some embodiments, a surface of the closed endplate 910A may be in contact with an end of a standpipe 820 when the fluid filter 805 is installed in the filter housing 802. The closed endplate 910A may include the bypass seal 915A. The bypass seal 915A may be an O-ring, a radial seal, or the like. The bypass seal 915A may be located on any component within the NFNR fluid filter assembly 800. For example, the bypass seal may be disposed on the fluid filter 805, the closed endplate 910A, etc.

The open endplate 910B is open and may receive the standpipe 820. The open endplate 910B includes a drain seal 915B. The drain seal 915B is disposed near the opening of the open endplate 910B and may seal a drain feature of the filter housing 802. The drain seal 915B, when installed, prevents fluid from flowing to the return outlet 845 via a drain 843 during use of the NFNR fluid filter assembly 800. When the fluid filter 805 is to be removed from the filter housing 802 (e.g., to clean the filter, to replace the filter, etc.), the removal of the drain seal 915B from the drain 843 allows fluid to return to the tank/reservoir. This drain seal 915B may prevent fluid from spilling out of the filter housing 802 when removing the fluid filter 805. The drain seal 915B may be an O-ring, a radial seal, or the like. In some embodiments, the drain feature may be located on the standpipe 820 (e.g., a plurality of apertures (1150) as illustrated in FIGS. 11A and 11B). In other embodiments, the drain feature may be located between the standpipe 820 and the filter housing 802.

A center tube 930 is located within an interior portion of the fluid filter 805. The center tube 930 has a smaller diameter than the interior portion of the fluid filter 805. The diameter of the center tube 930 is larger than the diameter of the standpipe so that the center tube surrounds the standpipe 820 when the fluid filter 805 is installed. The center tube 930 provides a structure that may prevent the filter media 905 from deforming under pressure when the NFNR fluid filter assembly 800 is in use.

Figure 10:
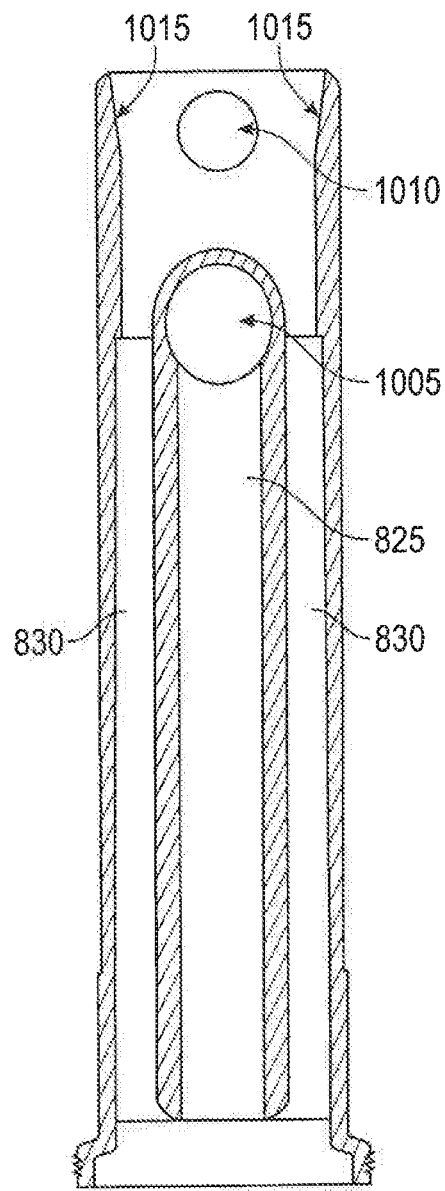
FIG. 10 illustrates a side cross-sectional view of the standpipe of FIG. 8, according to some embodiments.

FIG. 10 illustrates a side cross-sectional view of the standpipe 820, according to some embodiments. The standpipe 820 includes the filtered fluid outflow path 825 and the bypass flow path 830. An inlet aperture 1005 is configured and arranged to receive a filtered fluid and is in fluid communication with the filtered fluid outflow path 825. A bypass inlet aperture 1010 is configured and arranged to receive a filtered fluid when a neon-compliant filter is installed. Accordingly, the bypass inlet aperture 1010 is in fluid communication with the bypass flow path 830. In some embodiments, the location and diameter of the apertures 1005 and 1010 may vary. The number of apertures 1005 and 1010 may vary as well. For example, the inlet aperture 1005 may include a plurality of apertures and/or the bypass inlet aperture 1010 may include a plurality of apertures.

A first end of the standpipe 820 includes tapered interior walls 1015. The tapered interior walls 1015 may allow for easier installation of the fluid filter 805 over the standpipe 820. The tapered interior walls 1015 provide a surface to receive the bypass seal 915A. In some embodiments, the bypass seal 915A may alternatively be disposed on the exterior of the standpipe 820.

A second end of the standpipe 820 is threaded. The threads are configured and arranged such that the standpipe 820 may be installed in the filter housing 802. In some embodiments, the second end is not threaded and instead relies on a press-fit or other similar means of securely installing the standpipe 820 in the filter housing 802.

FIGS. 11A and 11B illustrate air NFNR fluid filter assembly 1100 including a filter housing 1102 with an installed fluid filter 1105, according to some embodiments. Aspects of FIGS. 11A and 11B may be the same as or similar to aspects of FIGS. 8-10. In some embodiments, a filter housing may also be referred to as a filter head. The fluid filter 1105 includes a center tube 1130. The center tube 1130 includes a bypass seal 1115A and a drain seal 1115B. The bypass seal 1115A and drain seal 1115B function similarly to the bypass seal 915A and the drain seal 915B. The bypass seal 1115A and drain seal 1115B illustrate alternative locations of the seals 915A and 915B. The bypass seal 1115A and the drain seal 1115B may be an O-ring a radial seal, or the like. The standpipe 1120 also includes a plurality of apertures 1150 disposed near a bottom end of the standpipe 1120. Similar to the drain feature described in accordance with FIGS. 8-10 above, the plurality of apertures 1150 are configured to return fuel to a tank/reservoir when the fluid filter 1105 is removed from the filter housing 1102.

Figure 12:
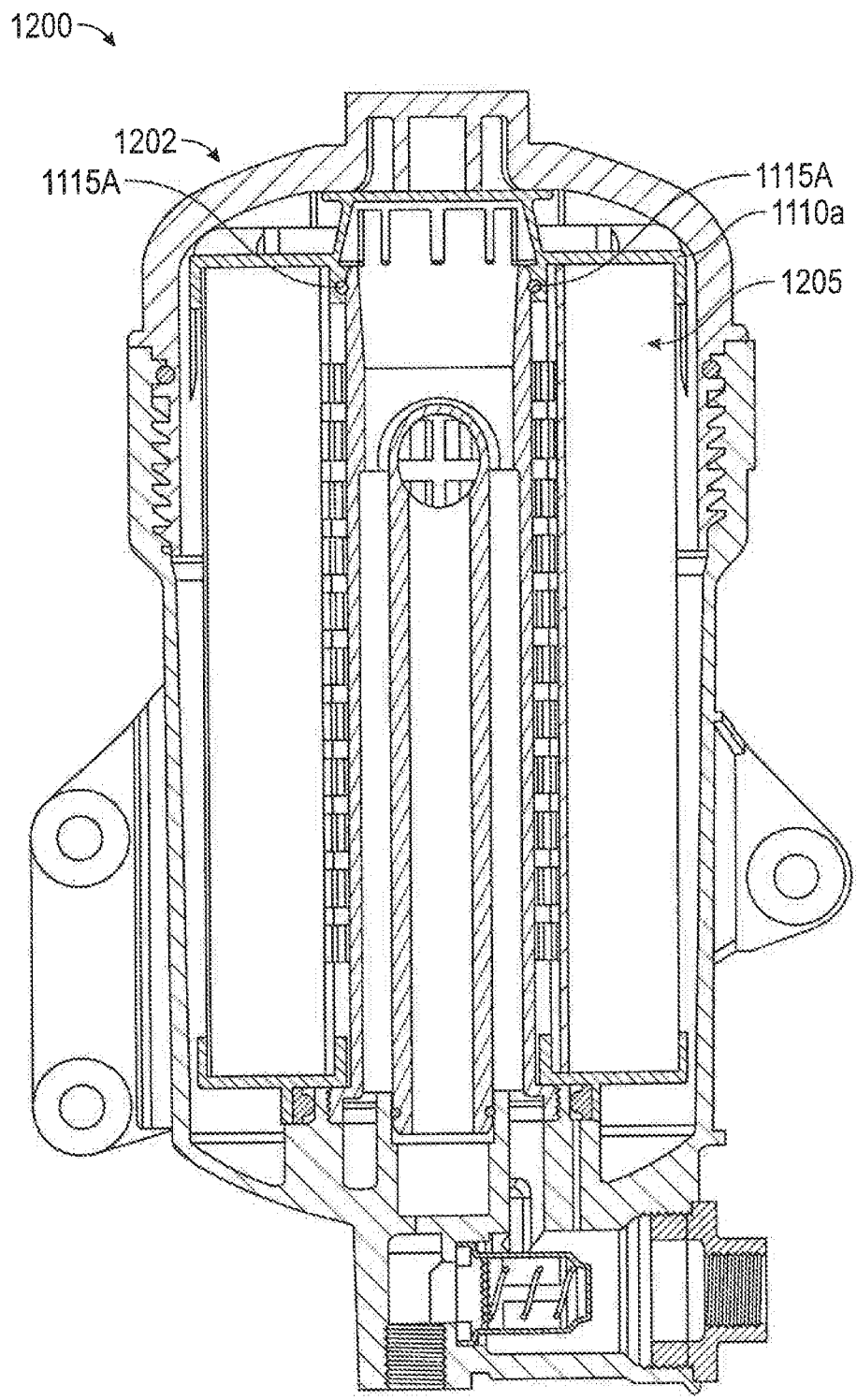
FIG. 12 illustrates a side cross-sectional view of an NFNR fluid filter assembly including a filter housing with an installed fluid filter, according to yet other embodiments.

FIG. 12 illustrates an NFNR fluid filter assembly 1200 including a filter housing 1202 with an installed fluid filter 1205, according to some embodiments. Aspects of FIG. 12 may be the same as or similar to aspects of FIGS. 8-11. In some embodiments, a filter housing may also be referred to as a filter head or the like. The fluid filter 1205 includes a closed endplate 1110A. The closed endplate 1110A functions similarly to the closed endplate 910A. The closed endplate 1110A includes a bypass seal 1115A. The bypass seal 1115A functions similarly to the bypass seal 915A. The bypass seal 1115A illustrates an alternative location of the seal 915A. The bypass seal 1115A may be an O-ring, a radial seal, or the like.

Figure 13:
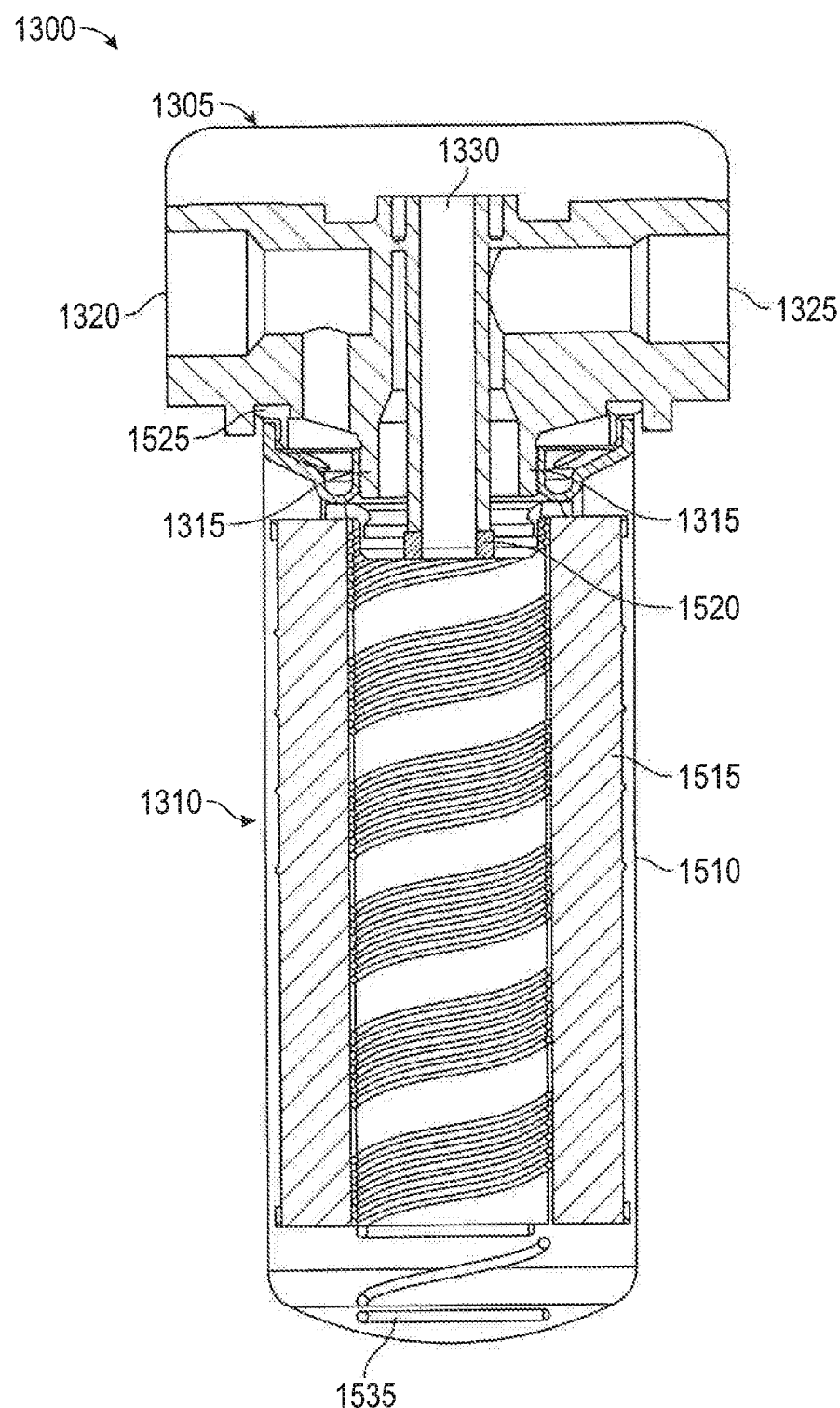
FIGS. 13 illustrates a side cross-sectional view of an NFNR fluid filter assembly including a filter head and a fluid filter, according to some embodiments.
Figure 14:
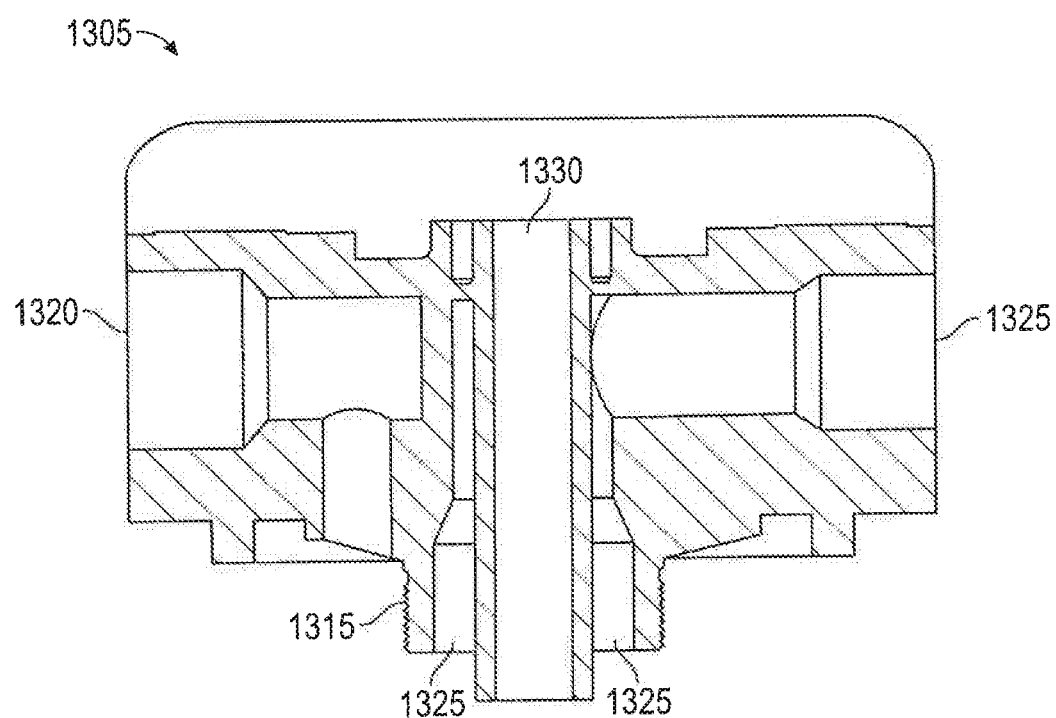
FIG. 14 illustrates a side cross-sectional view of the filter head of FIG. 13, according to some embodiments.
Figure 15:
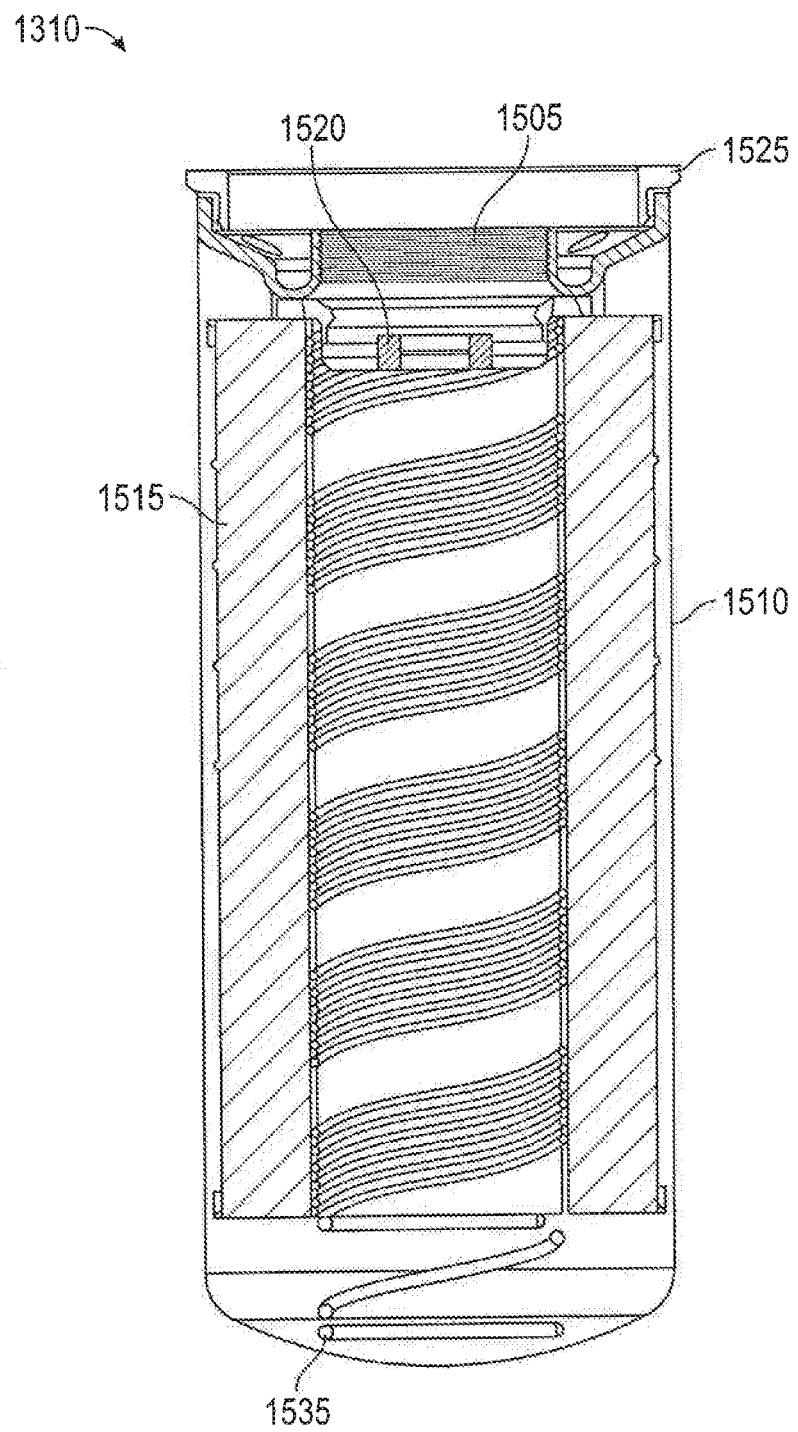
FIG. 15 illustrates a side cross-sectional view of the fluid filter of FIG. 13, according to some embodiments.

FIGS. 13-15 illustrate an NFNR fluid filter assembly 1300 including a filter head 1305 and a fluid filter 1310, according to some embodiments. Generally, the NFNR fluid filter assembly 1300 is configured and arranged such that when a non-compliant filter (e.g., lacking a bypass seal, etc.) is installed, a fluid output from the filter head 1305 is at a pressure and flow rate that are insufficient to, for example, run an internal combustion engine. A flow path of the fluid being filtered in the NFNR fluid filter assembly 1300 is determined based on whether a compliant or a non-compliant filter is installed. A flow path of the fluid being filtered in the NFNR fluid filter assembly 1300 may also be determined based on whether a compliant filter is in an installed or an uninstalled position.

As illustrated, the NFNR fluid filter assembly 1300 may be used for removing a contaminant (e.g., solid particulates, water, etc.) from fuel (e.g., diesel fuel, etc.) before outputting the fuel to a high pressure pump (not shown) and consequently injecting the fuel into a combustion chamber of an internal combustion engine (not shown). Aspects of the NFNR fluid filter assembly may be included in a fluid filtration system other than a fuel filtration system, such as oil filtration, hydraulic fluid filtration, coolant filtration, or the like. The NFNR fluid filter assembly 1300 may be configured for use in applications that include an internal combustion engine as well as in applications that do not include an internal combustion engine.

The filter head 1305 includes an input port 1320, an output port 1325, and a bypass port 1330. A filter head may also be referred to as a filter housing. The filter head 1305 may be configured to include additional ports. The filter head 1305 includes a mounting boss 1315 that may be securely connected to a nutplate 1505 in order to securely connect the filter head 1305 and the fluid filter 1310. As illustrated, the mounting boss 1315 is threaded. The mounting boss 1315 may include a different type of connection, such as a press-fit or other similar method of securely connecting the filter head 1305 and the fluid filter 1310. The filter head 1305 may be made of a metal, a metal alloy, a plastic, or another suitable material. The material may be dependent upon the application in which the NFNR fluid filter assembly 1300 is to be installed.

The fluid filter 1310 is a spin-on type filter. The fluid filter 1310 includes an outer shell 1510, a filter media 1515, a bypass seal 1520, a leak seal 1525, a filtered fluid seal 1530, a spring 1535, and a nutplate 1505. The filter media 1515 is generally configured to receive an unfiltered fluid, retain unwanted contaminants (e.g., solid particulates, water, etc.), and output a filtered fluid. The filter media 1515 may, for example, be composed of paper, cardboard, felt, or other similar materials. Endplates at first and second ends of the filter media 1515 may provide structural support to the filter media 1515. The material for the filter media 1515 may be dependent upon the type of fluid being filtered. The spring 1535 is configured to provide a force on the filter media 1515 to maintain the filter media 1515 in the proper location when the fluid filter 1310 is securely connected to the filter head 1305.

The input port 1320 receives an unfiltered fluid. The unfiltered fluid is filtered by the fluid filter 1310 and output to the output port 1325 when a compliant filter is installed. The compliant filter includes the bypass seal 1520 which prevents the cleaned fluid from flowing to the bypass port 1330. The bypass port 1330 may be connected in fluid communication with a bypass flow path that, for example, returns fluid to a fluid tank/reservoir. When the bypass seal 1520 is present, the outflow from the fluid filter 1310 is provided to the output port 1325, which is in fluid communication with a high pressure pump (not shown). When the bypass seal 1520 is not present, the outflow from the fluid filter 1310 is provided to the output port 1325 and the bypass port 1330. In some embodiments, the bypass seal 1520 can be located on the filter head 1305 while in other embodiments the bypass seal 1520 can be located on the fluid filter 1310. In other embodiments, the bypass seal 1520 may be located inside the fluid filter 1310. For example, the bypass seal 1520 may be located between the end plates of the filter media 1515 and may be in a central portion of the fluid filter 1310 or an outer portion of the fluid filter 1310, As a result, the pressure and flow rate of the fluid provided to the high pressure pump are insufficient to, for example, run an internal combustion engine.

Figure 16:
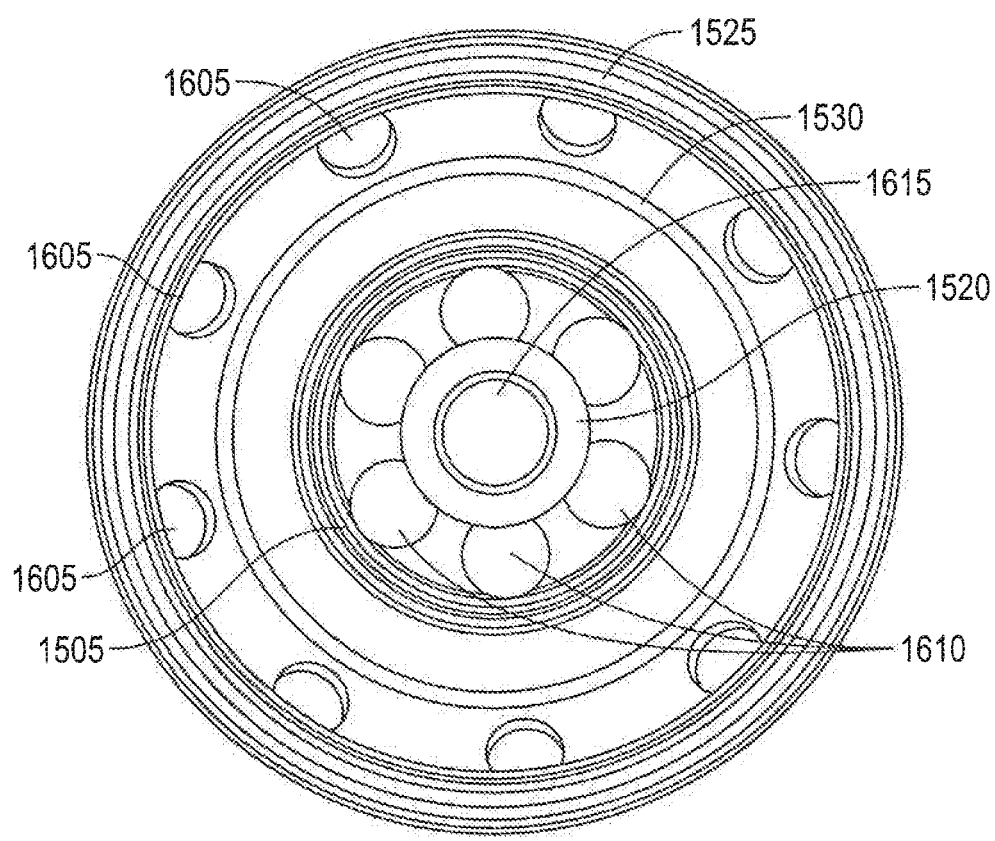
FIG. 16 illustrates a top view of the fluid filter of FIG. 13, according to some embodiments.

FIG. 16 illustrates a top view of the fluid filter 1310, according to some embodiments. As shown in the figure, the fluid filter 1310 includes a first plurality of apertures 1605, a second plurality of apertures 1610, a central aperture 1615, a bypass seal 1520, a leak seal 1525, and a filtered fluid seal

1530. The first plurality of apertures 1605 may be configured to receive an unfiltered fluid. The second plurality of apertures 1610 may be configured to output a filtered fluid. The central aperture 1615 may be configured as a bypass outlet. The configuration of the apertures 1605, 1610, and 1615 may be modified depending upon the application. For example, the first plurality of apertures 1605 may be configured to output a filtered fluid. The configuration may, for example, be dependent on the type of fluid to be filtered as well as the type of fluid filter (e.g., inside-out, outside-in, etc.). The configuration may also be dependent on the configuration of the filter head 1305 and the ports 1320, 1325, and 1330.

At the outer periphery of the fluid filter 1310 is the leak seal 1525. The leak seal 1525 may prevent fluid from leaking out of the NFNR fluid filter assembly 1300. Radially inward of the first plurality of apertures is the filtered fluid seal 1530. The filtered fluid seal 1530 may prevent the filtered fluid and the unfiltered fluid from mixing. The bypass seal 1520 is configured to prevent the filtered fluid outflow from flowing to the bypass port 1330. The configuration and location of the seals 1520, 1525, and 1530 is dependent upon the configuration and location of the apertures 1605, 1610, and 1615. For example, the bypass seal 1520 may be located on the filter head 1305 instead of on the fluid filter 1310. The seals 1520, 1525, and 1530 may be O-rings, radial seals, or the like.

According to one embodiment, a method of designing a fluid filter for use with a filter housing or filter head is provided. The fluid filter includes a filter media with a filtered fluid side and an unfiltered fluid side, a first endplate, and a second endplate. The filter housing or filter head include a bypass flow path. The fluid filter has an installed position and an uninstalled position relative to the filter housing or the filter head. In the installed position, a seal that seals between the filter and the filter housing or filter head seals the unfiltered fluid side from the filtered fluid side. In the installed position, a bypass seal seals between the fluid filter and the filter housing or filter head to seal the bypass flow path and restrict flow of fluid through the bypass flow path. When the fluid filter is in the uninstalled position or an incorrectly designed fluid filter is installed, the bypass flow path is opened to allow flow of fluid through the bypass flow path.

According to another embodiment, a method of providing a fluid filter for use with a filter housing or a filter head is provided. The fluid filter includes a filter media with a filtered fluid side and an unfiltered fluid side, a first endplate, and a second endplate. The filter housing or filter head includes a bypass flow path. The fluid filter has an installed position and an uninstalled position relative to the filter housing or the filter head. In the installed position, a seal that seals between the filter and the filter housing or filter head seals the unfiltered fluid side from the filtered fluid side. In the installed position, a bypass seal seals between the fluid filter and the filter housing or filter head to seal the bypass flow path and restrict flow of fluid through the bypass flow path. When the fluid filter is in the uninstalled position or an incorrectly designed fluid filter is installed, the bypass flow path is opened to allow flow of fluid through the bypass flow path.

According to one embodiment, a no filter no run (NFNR) fluid filter assembly configured for a low pressure fluid filtration system is provided. The fluid filter assembly includes a fluid filter having a bypass seal, a filter head including a sealing surface, and a bypass port. The bypass seal is configured to form a seating engagement with the sealing surface when the fluid filter is installed in the filter bead and may prevent a fluid flow through the bypass port.

According to another embodiment, a fluid filter is provided. The fluid filter includes filter media with a Filtered fluid side and an unfiltered fluid side, a first endplate, a second endplate, a first seal that seals the unfiltered fluid side from the filtered fluid side, and a bypass seal. The bypass seal is arranged to sealingly engage with a bypass channel to restrict flow of fluid through a bypass channel of a filter head or filter housing.

The terminology used herein is intended to describe particular embodiments and is not intended to be limiting. The terms "a," "an," and "the" include the plural forms as well, unless clearly indicated otherwise. The terms "comprises" and/or "comprising," when used herein, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used herein may, but does not necessarily, refer to the same embodiment. The embodiments described herein are exemplary only. Other and further embodiments may be devised without departing from the basic scope thereof, with the true scope and spirit of the disclosure being indicated by the claims that follow.

What is claimed:

1. A fluid filter cartridge comprising:
   a filter media having a filtered fluid side and an unfiltered fluid side;
   a first endplate;
   a second endplate; and
   a bypass seal;
   wherein the filter media is disposed between the first endplate and the second endplate, the fluid filter cartridge is configured to be disposed within a filter housing, the filter housing including a bypass flow outlet, the bypass seal configured to block fluid flow to the bypass flow outlet when the fluid filter cartridge is disposed in the filter housing; and
   wherein the first endplate is a closed endplate and the bypass seal is disposed on an axially-extending internal surface of the first endplate.

2. The fluid filter cartridge of claim 1, further comprising a center tube extending between the first endplate and the second endplate.

3. The fluid filter cartridge of claim 1, wherein the first endplate includes an opening configured to engage a standpipe of the filter housing.

4. The fluid filter cartridge of claim 1, further comprising a drain seal configured to block fluid flow to a drain of the filter housing when the fluid filter cartridge is disposed in the filter housing.

5. A fluid filter assembly, comprising:
   a fluid filter cartridge including:
      a filter media having a filtered fluid side and an unfiltered fluid side;
      a first endplate;
      a second endplate; and
      a bypass seal; and
   a filter housing including:
      a housing cover;
      a housing base;

a fluid inlet;
a fluid outlet; and
a bypass flow outlet;
wherein the filter media is disposed between the first endplate and the second endplate, the fluid filter cartridge is configured to be disposed within the filter housing, and the bypass seal is configured to block fluid flow to the bypass flow outlet when the fluid filter cartridge is disposed in the filter housing; and
wherein the first endplate is a closed endplate and the bypass seal is disposed on an internal surface of the first endplate.

6. The fluid filter assembly of claim 5, wherein the housing base further comprises a standpipe including a bypass flow path and a fluid outflow path configured to supply fluid flow to the fluid outlet.

7. The fluid filter assembly of claim 6, wherein the standpipe includes tapered walls configured to engage the bypass seal.

8. The fluid filter assembly of claim 5, wherein the housing base further comprises a drain outlet, and the fluid filter cartridge further comprises a drain seal.

9. The fluid filter assembly of claim 5, wherein the filter housing further comprises a plurality of structures, and the fluid filter cartridge further comprises a plurality of surfaces configured to engage the plurality of structures such that the fluid filter cartridge is properly located within the filter housing.

10. The fluid filter assembly of claim 5, wherein the fluid outlet is configured to supply filtered fuel to an engine.

11. The fluid filter assembly of claim 5, wherein the bypass flow outlet is configured to supply a bypass fluid flow to at least one of a fuel tank or a fuel transfer pump.

12. The fluid filter assembly of claim 5, wherein the fluid filter cartridge is a fuel filter, and wherein the bypass flow outlet is configured such that, in the absence of the fluid filter cartridge, an amount of fuel that flows through the fluid outlet is insufficient to start or run an engine.

13. The fluid filter assembly of claim 5, wherein the fluid filter cartridge is a fuel filter, and wherein the bypass flow outlet is configured such that, when the bypass seal blocks fuel flow through the bypass flow outlet, an amount of fuel that flows through the fluid outlet is sufficient to start or run an engine.

14. The fluid filter assembly of claim 5, wherein the housing base is configured to connect to the housing cover by a threaded connection.

* * * * *